Nov. 8, 1938.  P. F. ROSSMANN  2,136,318
HYDRAULIC BRAKE SYSTEM
Filed Nov. 14, 1934
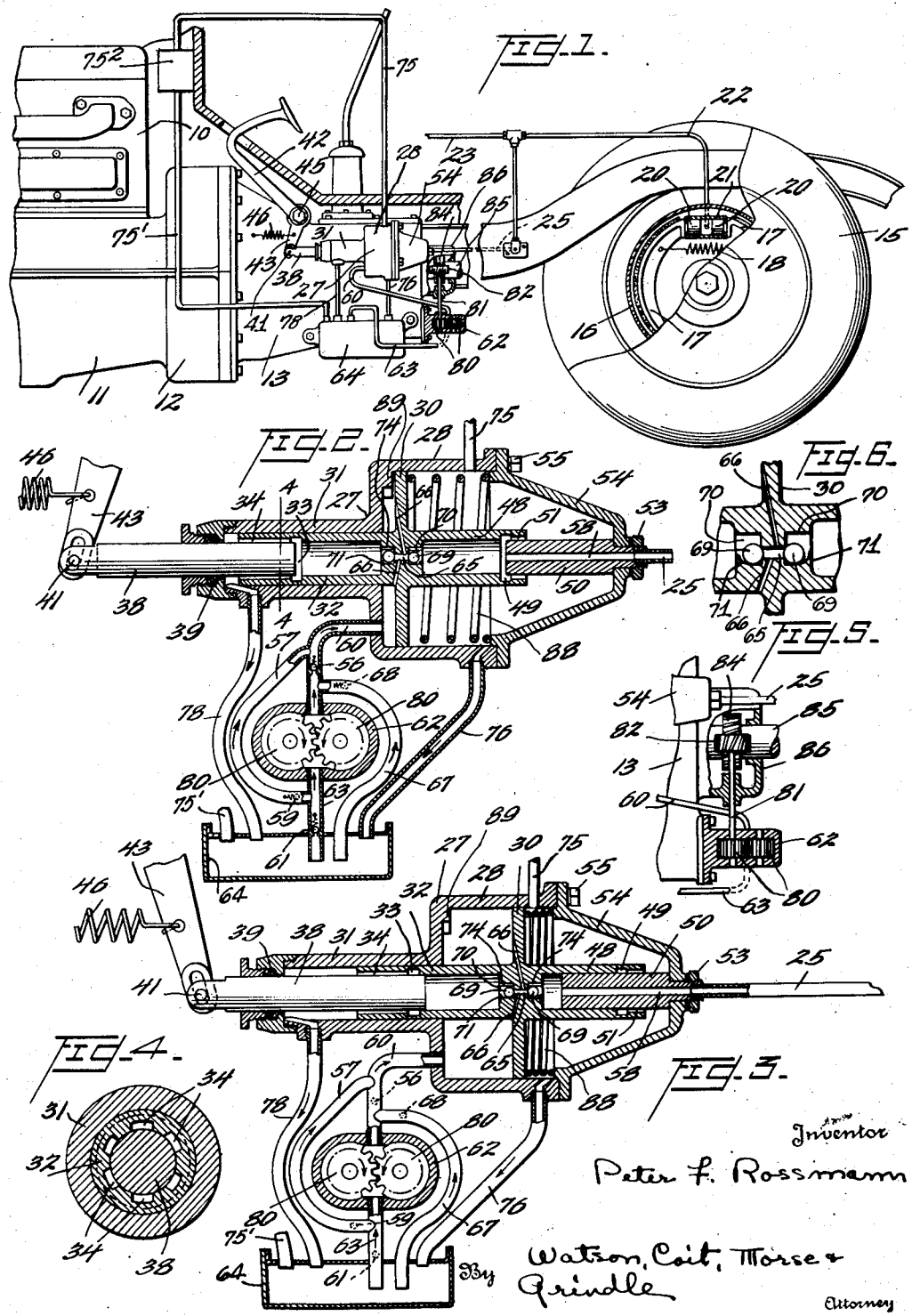
Inventor
Peter F. Rossmann
By Watson, Coit, Morse & Grindle
Attorney Patented Nov. 8, 1938

2,136,318

UNITED STATES PATENT OFFICE 2,136,318

HYDRAULIC BRAKE SYSTEM

Peter F. Rossmann, Detroit, Mich., assignor to Packard Motor Car Company, Detroit, Mich., a corporation of Michigan Application November 14, 1934, Serial No. 753,053

6 Claims. (Cl. 60—52)

This invention relates to brake mechanism for motor vehicles and more particularly to improvements in apparatus for supplying fluid under pressure for the actuation of vehicle brakes. It is the principal object of the invention to provide for the power application of the brakes, the usual manually operated brake control means being employed merely to initiate and regulate the application of power to set the brakes.

It is a feature of the invention that the manual effort required in the application of the brakes is reduced to a minimum, thus making possible the same control of a vehicle by an operator having only slight physical strength and rendering the driving of the vehicle less tiresome. It is a further feature of the invention that the degree of braking action is substantially independent of the force exerted by the operator in applying the brakes, the effectiveness of the brakes being determined primarily by the extent to which the usual brake pedal is depressed rather than by the magnitude of the pressure applied thereto.

It is a more specific object of the invention to provide operating mechanism for a fluid actuated brake employing a power driven fluid pressure device and means for multiplying the pressure delivered by the power device, in combination with a manually operable control mechanism therefor. In the preferred embodiment of the invention the power driven device is actuated from the propulsion means of the vehicle, for instance from the motor, the drive shaft, or other moving part.

Further objects and features of the invention will be apparent from the following description, taken in connection with the accompanying drawing, in which:

Figure 1 is a side elevation of portions of a motor vehicle illustrating one method of applying the present invention thereto;

Figures 2 and 3 are sectional views, partly diagrammatic, illustrating the position occupied by the principal elements of apparatus embodying the invention in the released and fully applied positions respectively of the brakes;

Figure 4 is a sectional view taken substantially on the line 4—4 of Figure 2;

Figure 5 is an enlarged sectional view of certain structure shown in Figure 1;

Figure 6 is a further enlarged sectional view of certain structures shown in Figure 1.

In order to facilitate an understanding of the invention, specific language is employed in describing the embodiment of the invention shown in the drawing and selected for the purpose of illustrating the principles thereof. It will nevertheless be understood that no limitation of the scope of the invention is intended by the use of such specific language, various structural alterations and modifications being contemplated such as would occur to one skilled in the art to which the invention relates.

Referring first to Figure 1, it will be observed that the vehicle to which the invention is applied is provided with the usual motor 10, having associated therewith a crank case 11, clutch housing 12, and transmission housing 13, the detailed construction of these units forming no part of the present invention. The vehicle is further provided with the usual vehicle wheels of which one is shown at 15, this wheel being provided with a brake drum 16 having expanding brake shoes 17 which are retained in the released position by a coil spring 18 acting therebetween and which may be set by the application of fluid pressure to opposed pistons 20 disposed within a cylinder 21, the latter being supplied with fluid under pressure from a pipe 22 communicating with the cylinder. The fluid employed may be the usual fluid supplied with brake mechanism of this character. Thus when the necessary pressure is applied within the cylinder 21, the pistons 20 will move outwardly and will force the brake shoes 17 against the brake drum 16 to frictionally retard the movement of the vehicle. The fluid brake system may comprise braking units of this character in association with all four wheels of the vehicle or with only two, it being appreciated that the present invention involves improvements in the apparatus by means of which pressure is applied to the working fluid; the structural details of the braking units associated with each wheel may assume any desired form.

The pipe 22 and a pipe 23 which may conduct fluid to braking units associated with the front vehicle wheels, are supplied with fluid from a pipe 25 communicating with the interior of a housing indicated generally in Figure 1 at 27, this housing being preferably secured to the transmission housing 13 of the vehicle in any suitable manner. As shown more particularly in Figures 2 and 3, this housing preferably comprises a cylinder 28 having a piston 30 supported for reciprocation therein. Forwardly of the cylinder 28, the housing 27 is provided with a portion 31 of reduced diameter, the internal wall of which serves a guide for the sleeve 32 which is carried by and preferably formed integrally with the piston 30. The sleeve 32 is provided intermediate the ends thereof with an internal annular recess 33 and is relieved as indicated at 34 in Figure 4 to provide a plurality of circumferentially spaced, longitudinally extending passages intermediate the annular recess 33 and the end of the sleeve 32. The member 38 extends within the portion 31 of the housing 27 through packing 39 and is slidably received within the sleeve 32, this member having articulated connection at 41 with the lower end 43 of a brake pedal 42 which is pivoted at 45 to the transmission housing and is normally rotated in a clockwise direction to the position in which it is shown in Figure 1 of the drawing by means of a spring 46 acting between the lower end of the pedal and the transmission housing.

The piston 30 is also provided with a rearwardly directed cylinder 48, secured thereto or formed integrally therewith, the cylinder 48 being provided with an annular recess 49 and being relieved as at 51 to provide a plurality of circumferentially spaced, longitudinally extending passages similar to the passages 34 in the sleeve 32. The interior of the cylinder 48 is dimensioned to receive a piston 50 which may be rigidly secured by means of a nut 53 to a cover member 54 which is bolted as at 55 to the rear end of the housing 27. Pipe 25 is secured within one end of the piston 50 and communicates with a passage 58 leading therethrough.

A conduit 60 which supplies fluid under pressure to the cylinder 28 behind the piston 30 to actuate the latter is in communication with the interior of the cylinder and with a pump housing 62, the latter being in turn supplied with fluid through a conduit 63 from a reservoir 64 which is shown in Figure 1 and diagrammatically in Figures 2 and 3. When the brakes are released and the parts occupy the position shown in Figure 2, fluid delivered to the cylinder 28 through the conduit 60 flows into a centrally disposed passage 65 in the piston 30 through a plurality of radially extending passages 66 and from thence in opposite directions past one-way valves into the cylinder 48 and the sleeve 32. These one-way valves may each consist of a ball 69 floating in a chamber 70 and retained therein by means of a lip 71 at the outer end of the chamber, the ball in the closed position of the valve seating against the end of the passage 65. One or more longitudinally extending grooves 74 are provided in each chamber 70 to ensure free movement of fluid from the passage 65 past the valves. Still referring to Figure 2, the fluid passing into the cylinder 48 is discharged through the annular recess 49 and the passages 51 into the non-working portion of the cylinder 28. Discharge conduits 76 provide for the return of this fluid to the reservoir 64.

Fluid emerging from the passage 65 into the sleeve 32 flows through the annular recess 33 and the passage 34, being returned to the reservoir through the conduit 78. A conduit 75 communicates with the non-working portion of the cylinder 28 and with the upper side of a storage reservoir 75″. A further conduit 75′ affords communication between the lower side of the reservoir 75″ and the reservoir 64. The reservoir 75″ may be constituted by the usual supply tank secured to the vehicle dash, this tank being occasionally charged with operating fluid in order that the entire system may remain filled at all times, as is common in braking systems of this type.

Within the housing 62 a pump is provided, this pump being preferably of the positive delivery type. Thus in the form of the invention illustrated herein, the pump comprises intermeshing, rotating toothed elements 80 which are suitably shrouded so that fluid entering between the teeth of these elements is carried about the periphery of the housing 62 and is ejected at the opposite end of the housing through the conduit 60, this type of pump being wholly conventional and well understood. One of the toothed elements 80 is secured to a driving shaft 81 which, as shown in Figure 1, may extend upwardly and carry at its upper end a gear 82 meshing with a worm 84 carried by or formed on the drive shaft 85 of the vehicle, the latter being connected in conventional manner through differential gearing to drive the rear vehicle road wheels. The gear 82 and shaft 81 may be supported in a housing for the vehicle drive shaft or in a separate housing 86 secured to the rear wall of the transmission housing.

While the parts occupy the position in which they are shown in Figure 2 with the vehicle brakes released, and while the pump elements 80 are being driven as hereinbefore indicated, fluid will be continuously circulated through the conduit 60 into the working end of the cylinder 28 and returned to the reservoir 64 through the conduits 76 and 78 as hereinbefore described. If, however, it is desired to apply the brakes, and the pedal 42 is depressed, the member 38 will be moved longitudinally and to the right as shown in Figure 2, first preventing the discharge of fluid through the annular recess 33 of the sleeve 32, and thereafter applying pressure to the fluid within the sleeve 32 and to the right of the member 38 to close the valve leading from the passage 65. On continued depression of the pedal the piston 30 and associated parts will be carried to the right with the member 38, the cylinder 48 moving against the piston 50 to close the annular recess 49 and apply pressure to the fluid within the cylinder 48 to close the one-way valve leading therein from the passage 65. It will now be observed that discharge of fluid from the working end of the cylinder 28 is prevented as the result of the sealing of the ends of the passage 65 by the balls 69, and the fluid supplied under pressure by the pump elements 80 will be applied directly to the piston 30 to move the latter to the right. Since the area of the piston 30 is quite large as compared with the area of the piston 50, the fluid pressure within the cylinder 48 will promptly be greatly multiplied and fluid under very much higher pressure than that delivered by the pump elements 80 will be supplied through the pipe 25 to the brake units at the vehicle wheels.

In practice, this difference in the area of the pistons 30 and 50 should be sufficient to ensure the development of a fluid pressure at the road wheel brake units which will provide the maximum braking effort required, while utilizing a power driven pump developing very low pressure, whereby the brake pedal may be operated with a minimum of effort.

Movement of the piston 30 to the right will continue so long as the member 38 extends sufficiently far within the sleeve 32 to interrupt communication with the annular recess 33. In other words, the arrangement just described constitutes a follow-up mechanism, it being necessary to continue the depression of the pedal 42 in order to maintain the movement of the piston 30 to the right. If the depression of the pedal 42 ceases at any intermediate point, the piston 30 and the associated sleeve 32 will partake of a slight additional movement to the right which will suffice to uncover the recess 33, thus slightly relieving the pressure on the piston 30 and retarding further movement of the latter to the right. In this manner the position of the piston 30, and consequently the extent to which the vehicle brakes are applied, is definitely controlled by the extent of depression of the brake pedal 42, the pressure required to depress the brake pedal 42 being on the other hand substantially constant regardless of the extent of depression thereof. When the pedal 42 has been depressed to the limit of its movement, the parts will occupy substantially the position in which they are shown in Figure 3 of the drawing, the brake units at the road wheels being then fully applied.

When it is desired to release the brake, the brake pedal 42 is permitted to rise and the return of the pistons 20 of the individual brake units will return the working fluid through the pipe 25 into the cylinder 48 and restore the piston 30 to the position in which it is shown in Figure 2. In order to ensure the return of the piston 30, and to compensate for any possible leakage in the system between the cylinder 48 and the individual brake units at the road wheels, a coil spring 88 or other yielding means may be provided, this spring being preferably located within the non-working end of the cylinder 28 and acting between the cover member 54 and the piston 30. A stop member 89, which is represented as formed in the cylinder 28 and adapted to engage the piston 30, is preferably provided to limit movement of the parts to the initial position.

While the vehicle is at a standstill, the brake may be applied independently of the pump elements 80, the member 38 compressing the fluid within the sleeve 32 and displacing the piston 30 to the right to the desired extent. While this mode of operation involves no multiplication of the pressure at any point in the system, it will be appreciated that such multiplication of pressure is principally desirable when the car is moving forward at high speed, at which time the maximum braking effort is necessary.

It is of course desirable that the brake applying mechanism be operated in equally effective manner whether the vehicle is moving forwardly or rearwardly. For this purpose any well-known type of automatically reversing gearing may be substituted for the simple worm drive 82, 84 so that unidirectional rotation of the pump elements 80 is attained regardless of the direction of rotation of the drive shaft 85. However, I prefer to employ the arrangement illustrated in Figures 2 and 3 of the drawing in which unidirectional flow of fluid through the conduit 60 is secured regardless of the direction of rotation of which the pump elements 80 partake.

Thus the conduit 60 may be provided with a check valve 56, permitting fluid flow in the conduit away from but not toward the pump. A return conduit 57 communicates with the conduit 60 outwardly of the check valve 56 and is in turn provided with a check valve 59 permitting fluid flow in the conduit 57 from the conduit 63 to the conduit 60, but preventing flow in the opposite direction. A check valve 61 in the conduit 63 is provided to prevent fluid flow from the conduit 63 into the reservoir 64, while permitting flow in the opposite direction.

A conduit 67 provided with a check valve 68 affords communication between the conduit 60 and the reservoir 64, the check valve 68 permitting fluid flow from the reservoir 64 into the conduit 60 but preventing flow in the opposite direction.

It will be observed that with this arrangement when the gear elements are rotated in the direction indicated by the arrows in Figures 2 and 3, fluid will be withdrawn from the reservoir 64 through the conduit 63 and discharged through the conduit 60 into the cylinder 28 as hereinbefore described. If, however, the vehicle is operated in the reverse direction, the pump elements 80 will rotate in a direction opposite to that shown by the arrows in Figures 2 and 3 with the result that fluid will be withdrawn from the reservoir 64 through the conduit 67 and through the lower portion of the conduit 60 into the pump, being discharged through the upper portion of the conduit 63 and through the conduit 57 into the upper portion of the conduit 60 and thence to the cylinder 28. This construction is intended to be illustrative only, it being possible to substitute other unidirectional flow pump systems for that shown herein.

It will be appreciated that cylinder 28 and piston 30, cylinder 48 and piston 50 constitute a fluid motor-pump unit, and that the cylinders and pistons of the unit may be reversed in position and function without affecting the result. For instance, it is not material whether the piston 50 or the cylinder 48 is movable; relative movement is all that is required.

The manually operated member 38 constitutes in effect a control means for a fluid by-pass, this by-pass moving with the piston 30 and the associated parts, and comprising recess 33 and passages 34. If desired, an additional by-pass connecting the delivery conduit 60 with either of the return conduits 76 or 78 may be provided, this by-pass being controlled by a pressure operated check valve releasable when a predetermined pressure is exceeded to ensure against the development of excessive pressures in the system.

It will be observed that the arrangement provides a simple and effective device whereby fluid under high pressure may be supplied for the braking of the vehicle with a minimum of effort on the part of the operator, multiplication of that pressure obtained directly by the manipulation of the brake pedal being effected without increase in the range of movement of the pedal.

Having thus described the invention, what is claimed as new and desired to be secured by Letters Patent is:

1. In a fluid operated brake system for motor vehicles, the combination with a power driven fluid pump, of a fluid motor comprising a cylinder and a piston reciprocable therein and operable by fluid delivered by said power pump, a second fluid pump comprising a cylinder and a piston reciprocable therein and operable as a unit with said motor, an initially open discharge passage for fluid from said motor cylinder adapted to be closed on relative movement of said motor cylinder and piston, a second initially open discharge passage for fluid from said motor cylinder, manually operable means for closing said second discharge passage and initiating relative movement of said motor cylinder and piston to close said first discharge passage, and means, including trapped fluid, transmitting thrust between said manually operable means and said second pump whereby the latter may be manually displaced independently of said first pump.

2. In a fluid operated brake system for motor vehicles, the combination with a vehicle brake, of mechanism responsive to fluid pressure for applying said brake, and means for supplying fluid under pressure to said mechanism, said means including a power driven fluid pump, a second pump operable by fluid delivered from said first pump and supplying fluid to said mechanism under pressure substantially greater than that developed by said first pump, manually operable means for controlling the operation of said second pump, and means, including trapped fluid transmitting thrust between said manually operable means and said second pump whereby the latter may be manually displaced independently of said first pump to deliver fluid to said mechanism.

3. In a fluid operated brake system for motor vehicles, the combination with a vehicle brake, of mechanism responsive to fluid pressure for applying said brake, and means for supplying fluid under pressure to said mechanism, said means including a power driven fluid pump, a second pump operable by fluid delivered from said first pump and supplying fluid to said mechanism under pressure substantially greater than that developed by said first pump, manually operable means for controlling the operation of said second pump, said manually operable means including a follow-up mechanism for initiating and determining the extent of operation of said second pump, and means, including trapped fluid, transmitting thrust between said manually operable means and said second pump whereby the latter may be manually displaced independently of said first pump to deliver fluid to said mechanism.

4. In a fluid operated brake system for motor vehicles, the combination with a vehicle brake, of mechanism responsive to fluid pressure for applying said brake, and means for supplying fluid under pressure to said mechanism, said means including a power driven fluid pump, a fluid motor-pump unit driven by fluid from said power driven pump and delivering fluid to said mechanism, manually operable means for controlling the supply of motive fluid to said motor-pump unit, and means, including trapped fluid, affording an operative thrust transmitting connection between said manually operable means and said unit for effecting operation of the latter independently of said power driven pump to deliver fluid to said mechanism.

5. In a fluid operated brake system for motor vehicles, the combination with a vehicle brake, of mechanism responsive to fluid pressure for applying said brake, and means for supplying fluid under pressure to said mechanism, said means including a power driven fluid pump, a fluid motor-pump unit driven by fluid from said power driven pump and delivering fluid to said mechanism, a by-pass for diverting motive fluid from said motor-pump unit, manually operable means for opening and closing said by-pass, and means, including trapped fluid, affording an operative thrust transmitting connection between said manually operable means and said unit for effecting operation of the latter independently of said power driven pump to deliver fluid to said mechanism.

6. In a fluid operated brake system for motor vehicles, the combination with a power driven fluid pump, a motor-pump unit operable by low-pressure motive fluid from said power pump and delivering high-pressure fluid to the brake, manually operable means for controlling the delivery of motive fluid to said motor-pump unit, and means, including trapped fluid, transmitting thrust between said manually operable means and said unit whereby the latter may be manually displaced to deliver fluid to said mechanism.

PETER F. ROSSMANN.